United States Patent
Zhou et al.

(10) Patent No.: US 11,450,322 B2
(45) Date of Patent: Sep. 20, 2022

(54) SPEECH CONTROL METHOD AND ELECTRONIC DEVICE

(71) Applicant: Huawei Technologies Co., Ltd., Shenzhen (CN)

(72) Inventors: Xuan Zhou, Shenzhen (CN); Shoucheng Wang, Shanghai (CN); Jiayu Long, Shenzhen (CN); Yue Gao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/295,569

(22) PCT Filed: Nov. 15, 2019

(86) PCT No.: PCT/CN2019/118645
§ 371 (c)(1),
(2) Date: May 20, 2021

(87) PCT Pub. No.: WO2020/103764
PCT Pub. Date: May 28, 2020

(65) Prior Publication Data
US 2021/0407507 A1 Dec. 30, 2021

(30) Foreign Application Priority Data
Nov. 23, 2018 (CN) .......................... 201811407531.7

(51) Int. Cl.
*G10L 15/00* (2013.01)
*G10L 15/22* (2006.01)
(Continued)

(52) U.S. Cl.
CPC .......... *G10L 15/22* (2013.01); *G06F 3/04842* (2013.01); *G06F 3/04883* (2013.01);
(Continued)

(58) Field of Classification Search
CPC ........... G10L 15/22; G06F 3/048; G06F 40/30
See application file for complete search history.

(56) References Cited

U.S. PATENT DOCUMENTS 10,373,613 B2   8/2019   Wang et al.
10,896,050 B2 *  1/2021   Wang ...................... H04W 4/70
(Continued)

FOREIGN PATENT DOCUMENTS

CN   103338311 A   10/2013
CN   103442138 A   12/2013
(Continued)

OTHER PUBLICATIONS

ITU-T Telecommunication Standardization Sector of ITU, H.264, "Series H: Audiovisual and Multimedia Systems, Infrastructure of audiovisual services—Coding of moving video", Advanced video coding for generic audiovisual services, Apr. 2017, 812 pages.

*Primary Examiner* — Daniel Abebe
(74) *Attorney, Agent, or Firm* — Slater Matsil, LLP

(57) ABSTRACT

A speech control method and an electronic device. The method includes displaying a first interface of an application, where the first interface includes a control used to update the first interface, enabling a speech application in the background in response to a wake-up signal entered by a user, displaying M speech input prompts on the first interface, where each speech input prompt corresponds to at least one control on the first interface, collecting a speech control signal entered by the user, where the speech control signal corresponds to a first speech input prompt in the M speech input prompts, and displaying a second interface of the application in response to the speech control signal, where the second interface is an interface obtained through updating after a first control on the first interface is triggered, and the first control corresponds to the first speech input prompt.

20 Claims, 15 Drawing Sheets

(51) Int. Cl.
*G06F 3/04842* (2022.01)
*G06F 3/04883* (2022.01)
*G06F 3/16* (2006.01)

(52) U.S. Cl.
CPC .............. *G06F 3/165* (2013.01); *G06F 3/167* (2013.01); *G10L 2015/223* (2013.01)

(56) References Cited

U.S. PATENT DOCUMENTS

| | | | |
|---|---|---|---|
| 2002/0059073 A1* | 5/2002 | Zondervan | H04L 67/04 704/270.1 |
| 2003/0234818 A1* | 12/2003 | Schmid | G10L 15/26 715/810 |
| 2007/0213984 A1 | 9/2007 | Ativanichayaphong et al. | |
| 2009/0164113 A1 | 6/2009 | Kang | |
| 2010/0063818 A1* | 3/2010 | Mason | G10L 13/00 704/251 |
| 2010/0312547 A1 | 12/2010 | Van Os et al. | |
| 2011/0205149 A1 | 8/2011 | Tom | |
| 2013/0035942 A1 | 2/2013 | Kim et al. | |
| 2013/0339033 A1 | 12/2013 | Agapi et al. | |
| 2014/0160316 A1* | 6/2014 | Hwang | H04N 1/32117 348/231.99 |
| 2015/0161989 A1* | 6/2015 | Hsu | G10L 15/08 704/251 |
| 2015/0254058 A1 | 9/2015 | Klein et al. | |
| 2015/0339049 A1* | 11/2015 | Kasemset | G06F 3/0482 715/728 |
| 2016/0073350 A1* | 3/2016 | Shen | H04W 52/0254 704/275 |
| 2017/0263249 A1 | 9/2017 | Akbacak et al. | |
| 2018/0308486 A1 | 10/2018 | Saddler et al. | |
| 2018/0324115 A1* | 11/2018 | Aggarwal | H04L 51/02 |
| 2019/0005957 A1* | 1/2019 | Yoon | G10L 15/22 |
| 2021/0082435 A1* | 3/2021 | LeBeau | G10L 15/22 |

FOREIGN PATENT DOCUMENTS

| | | | | |
|---|---|---|---|---|
| CN | 103871437 A | | 6/2014 | |
| CN | 103885596 A | | 6/2014 | |
| CN | 103885693 A | | 6/2014 | |
| CN | 104076916 A | | 10/2014 | |
| CN | 105094331 A | | 11/2015 | |
| CN | 105895093 A | | 8/2016 | |
| CN | 105957530 A | | 9/2016 | |
| CN | 107277225 A | | 10/2017 | |
| CN | 107346229 A | | 11/2017 | |
| CN | 108027738 A | | 5/2018 | |
| CN | 108366281 A | | 8/2018 | |
| CN | 108520750 A | | 9/2018 | |
| CN | 108572764 A | | 9/2018 | |
| CN | 108829371 A | | 11/2018 | |
| CN | 109584879 A | | 4/2019 | |
| GB | 2388209 A | | 11/2003 | |
| JP | 2007171809 A | * | 7/2007 | ............ G10L 15/22 |
| JP | 2013041580 A | | 2/2013 | |
| JP | 2015026102 A | | 2/2015 | |
| JP | 2015095002 A | * | 5/2015 | ............ G06F 9/451 |
| JP | 2017076438 A | * | 4/2017 | ............ G06F 9/445 |
| KR | 20150104930 A | * | 9/2015 | ............ G06F 15/16 |
| KR | 20160006464 A | * | 1/2016 | ............ G10L 15/32 |
| KR | 20180046780 A | * | 5/2018 | ............ G10L 15/02 |
| KR | 20180109633 A | * | 10/2018 | ............ G10L 15/22 |
| RU | 2664410 C2 | | 8/2018 | |
| WO | 2010141802 A1 | | 12/2010 | |
| WO | 2011065653 A2 | | 6/2011 | |
| WO | 2014055181 A1 | | 4/2014 | |
| WO | 2018135753 A1 | | 7/2018 | |

* cited by examiner

SPEECH CONTROL METHOD AND ELECTRONIC DEVICE

CROSS REFERENCE TO RELATED APPLICATIONS

This application is a national stage of International Application No. PCT/CN2019/118645, filed on Nov. 15, 2019, which claims priority to Chinese Patent Application No. 201811407531.7, filed on Nov. 23, 2018. Both of the aforementioned applications are hereby incorporated by reference in their entireties.

TECHNICAL FIELD

This application relates to the field of communications technologies, and in particular, to a speech control method and an electronic device.

BACKGROUND

A speech recognition technology is a technology that enables a machine (for example, a mobile phone or a wearable device) to convert a sound signal into a corresponding text or command through recognition and understanding. Currently, many mobile phones are installed with a speech app used for speech recognition, such as a speech assistant (for example, Xiaoai, Siri, and Xiao E). Usually, the mobile phone may preset one or more wake-up signals (for example, a tapping signal or a wake-up word such as "Hello, Xiao E"). When it is detected that a user enters these wake-up signals, it indicates that the user has an intention of using a speech recognition function at this time. Therefore, the mobile phone may be triggered to start the speech app to perform speech recognition, and then execute a corresponding speech task.

Usually, before delivery, a specific speech task that can be recognized and executed by the mobile phone is preconfigured in the mobile phone, for example, a speech task for querying weather and a speech task for calling a contact. As shown in FIG. 1, the user may view, on a settings interface 101 of the speech app, all speech tasks specifically supported by each application. However, because the speech tasks are of various types, in a specific process of using the application, the user may forget whether the application supports the speech recognition function, or forget a specific task in the application that can be controlled through speech. Consequently, usage of the speech app in the mobile phone is not high, the speech recognition function of the speech app cannot be fully used on the mobile phone, and the speech app cannot help the user to free hands.

SUMMARY

Embodiments of this application provide a speech control method and an electronic device, so that a user can be prompted to execute, in a process of running an application, a speech task related to the application. This improves speech control efficiency of a speech app in the electronic device and user experience.

To achieve the foregoing objectives, the following technical solutions are used in this application.

According to a first aspect, an embodiment of this application provides a speech control method, including displaying, by an electronic device, a first interface of an application, where the first interface includes a control used to update the first interface, if a wake-up signal entered by a user is received, enabling, by the electronic device, a speech application in the background, in addition, displaying, by the electronic device on the first interface, M (where M is an integer greater than 0) speech input prompts provided by the speech application, where each speech input prompt corresponds to at least one control on the first interface, subsequently, collecting, by the electronic device by using the enabled speech application (for example, a speech assistant such as Siri or Xiao E), a speech control signal entered by the user, and if the speech control signal corresponds to a first speech input prompt in the M speech input prompts, displaying, by the electronic device, a second interface of the application in response to the speech control signal, where the second interface is an interface obtained through updating after a first control (where the first control corresponds to the first speech input prompt) on the first interface is triggered.

In other words, when the electronic device displays an interface of an application, if it is detected that the user wakes up the speech application, the electronic device may prompt, by using the speech application, the user to enter a speech input prompt on the current interface. The speech input prompt is associated with one or more controls on the interface. In this way, once it is detected that the user enters a speech control signal corresponding to a speech input prompt, the electronic device may trigger a corresponding control based on the speech control signal, so that the electronic device updates the interface that is being displayed. In this way, in a process of using the application, the user may enter, to the electronic device based on the speech input prompt, a speech control signal that can be executed on the current interface. This improves speech control efficiency of a speech app in the electronic device and improves user experience.

In a possible design method, after the enabling, by the electronic device, a speech application in the background, the method further includes if a touch control operation performed by the user on the control on the first interface is detected, executing, by the electronic device, an operation instruction corresponding to the touch control operation. In other words, after the electronic device enables the speech application in the background, because the speech application running in the background does not affect interaction between the user and the foreground application, the user can still operate the control on the first interface on the displayed first interface.

In a possible design method, after the enabling, by the electronic device, a speech application in the background, the method further includes displaying, by the electronic device, an identifier of the speech application on the first interface, to prompt the user that the speech application is being enabled or has been enabled in the background. The identifier of the speech application may be displayed on the first interface in a form of a floating button, and the user may adjust a location of the identifier on the first interface.

In a possible design method, after the displaying, by an electronic device, a first interface of an application, the method further includes displaying, by the electronic device, a prompt button on the first interface, and if the electronic device receives a click operation of clicking the prompt button by the user, displaying, by the electronic device, the M speech input prompts on the first interface in response to the click operation.

In a possible design method, after the displaying, by an electronic device, a first interface of an application, the method further includes obtaining, by the electronic device, a configuration file associated with the first interface, where the configuration file records N (where N is an integer greater than or equal to M) speech tasks that can be executed by the electronic device on the first interface, and in this case, the displaying, by the electronic device on the first interface, M speech input prompts includes displaying, by the electronic device, the M speech input prompts on the first interface based on the configuration file, where each speech input prompt is associated with one speech task in the configuration file. For example, a speech input prompt "play" is associated with a playback task in the configuration file.

For example, the M speech input prompts may be in a one-to-one correspondence with M speech tasks whose use frequencies each are greater than a threshold in the N speech tasks.

In a possible design method, the configuration file further includes a correspondence between a first speech task and a first touch event of the first control, where the first speech task is one of the N speech tasks, after the collecting, by the electronic device, a speech control signal entered by the user, the method further includes determining, by the electronic device, that a speech task corresponding to the speech control signal is the first speech task, and the displaying, by the electronic device, a second interface of the application in response to the speech control signal includes executing, by the electronic device, the first touch event on the first control in response to the speech control signal, so that the electronic device updates the first interface to the second interface.

In other words, the electronic device may convert, based on the configuration file of the first interface, the speech control signal entered by the user into a corresponding touch event, and then execute the touch event. This implements a function of controlling each operation button on the first interface by using a speech. In this way, the electronic device can implement, on each interface of the application, a speech control function for each operation button on the interface. This improves speech control efficiency of the mobile phone and user experience.

In a possible design method, when the electronic device executes the first touch event on the first control, the method further includes displaying, by the electronic device, an animation effect presented when the user executes the first touch event on the first control, so that the user obtains good user experience in both a graphical user interface (GUI) and a voice user interface (VUI).

In a possible design method, after the collecting, by the electronic device, a speech control signal entered by the user, the method further includes sending, by the electronic device, the speech control signal and interface information of the first interface to a server, so that the server recognizes, based on the interface information, the speech task corresponding to the speech control signal, where the interface information includes at least one of an identifier of the first interface, a page type of the first interface, or a type of the application to which the first interface belongs. In this case, because the interface information can reflect an actual use scenario of the current electronic device, the server can more accurately perform, based on the interface information, speech recognition on the speech control signal entered by the user, so as to more accurately determine an actual speech task that needs to be executed by the user.

According to a second aspect, this application provides an electronic device, including a touchscreen, where the touchscreen includes a touch-sensitive surface and a display, one or more processors, one or more memories, a communications module, and one or more computer programs. The processor is coupled to each of the touchscreen, the communications module, and the memory. The one or more computer programs are stored in the memory. When the electronic device runs, the processor executes the one or more computer programs stored in the memory, so that the electronic device performs the speech control method according to any one of the possible designs.

According to a third aspect, this application provides a computer storage medium, including a computer instruction. When the computer instruction is run on an electronic device, the electronic device is enabled to perform the speech control method according to any one of the possible designs of the first aspect.

According to a fourth aspect, this application provides a computer program product. When the computer program product is run on an electronic device, the electronic device is enabled to perform the speech control method according to any one of the possible designs of the first aspect.

It may be understood that the terminal according to the second aspect, the computer storage medium according to the third aspect, and the computer program product according to the fourth aspect are all used to perform the corresponding method provided above. Therefore, for beneficial effects that the terminal, the computer storage medium, and the computer program product can achieve, refer to beneficial effects in the corresponding method provided above. Details are not described herein.

DETAILED DESCRIPTION OF ILLUSTRATIVE EMBODIMENTS

The following describes the implementations of the embodiments of this application in detail with reference to accompanying drawings.

A speech control method provided in the embodiments of this application may be applied to an electronic device, such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device. This is not limited in the embodiments of this application.

Figure 1:
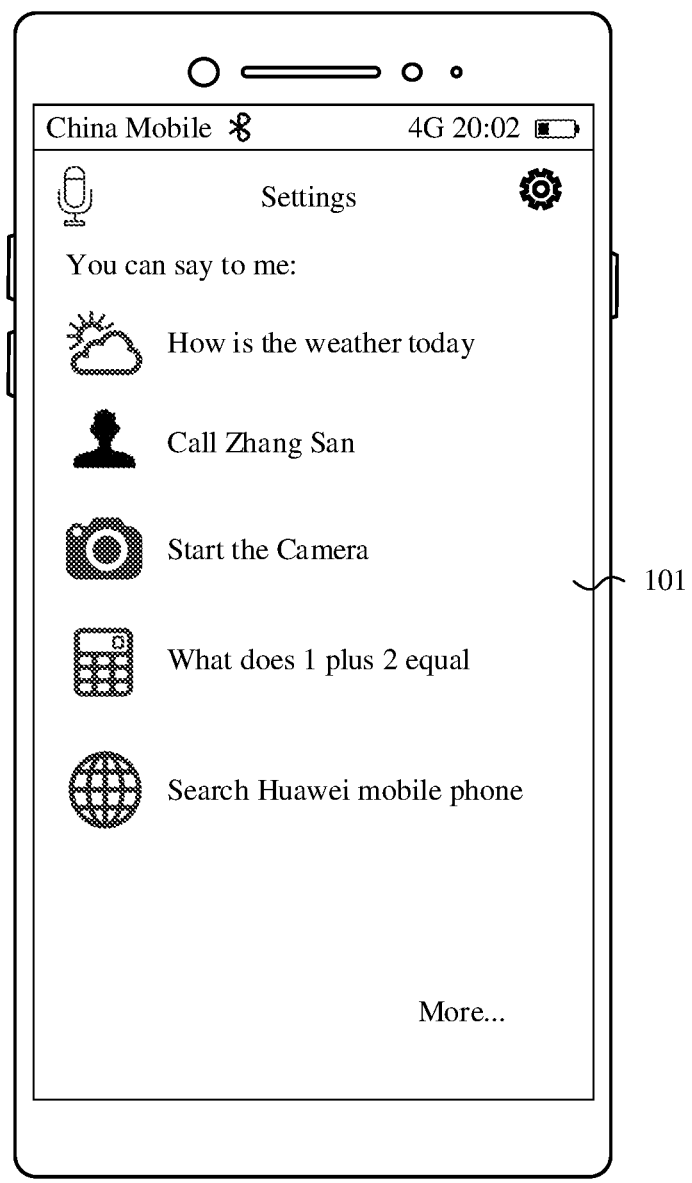
FIG. 1 is a schematic diagram of a settings interface of a speech application in the prior art.
Figure 2:
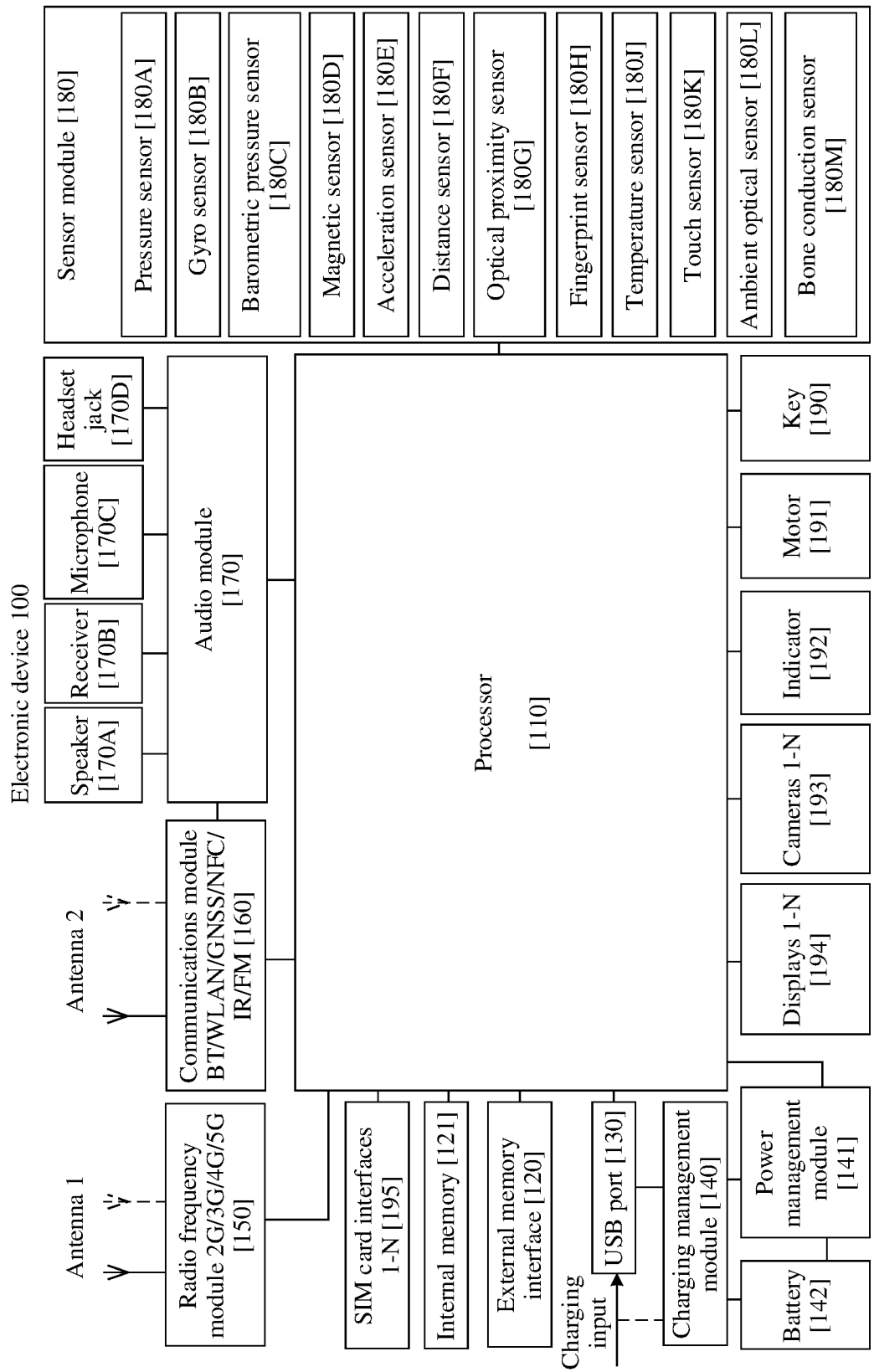
FIG. 2 is a schematic structural diagram 1 of an electronic device according to an embodiment of this application.

For example, FIG. 2 is a schematic structural diagram of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that has been used or cyclically used by the processor 110. If the processor 110 needs to use the instruction or the data again, the processor 110 may directly invoke the instruction or the data from the memory. This avoids repeated access and reduces a waiting time of the processor no. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be used for audio communication, and samples, quantizes, and encodes an analog signal. In some embodiments, the audio module 170 may be coupled to the wireless communications module 160 by using a PCM bus interface. In some embodiments, the audio module 170 may alternatively transmit an audio signal to the wireless communications module 160 by using the PCM interface, to implement a function of answering a call by using a Bluetooth headset. Both the I2S interface and the PCM interface may be configured to perform audio communication.

The UART interface is a universal serial data bus, and is configured for asynchronous communication. The bus may be a two-way communications bus. The bus converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 by using the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to perform data transmission between the electronic device 100 and a peripheral device, or may be configured to connect to a headset to play audio by using the headset. The interface may be further configured to connect to another electronic device such as an augmented reality (AR) device.

It may be understood that an interface connection relationship between the modules that is shown in this embodiment of this application is merely an example for description, and does not constitute a limitation on a structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor no. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), near field communication (NFC), infrared (IR) technology, and the like. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (long term evolution, LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and connects the display 194 to the application processor. The GPU is configured to perform mathematical and geometric computation, and render an image. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a micro-oLed, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image is generated for an object by using a lens and is projected onto the light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transform on frequency energy and the like.

The video codec is configured to compress or decompress a digital video. The electronic device 100 may support one or more video codecs. In this way, the electronic device 100 may play back or record videos in a plurality of coding formats, for example, moving picture experts group (MPEG) 1, MPEG2, MPEG3, and MPEG4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 by using the external memory interface 120, to implement a data storage function. For example, a file such as music and a video is stored in the external memory card.

The internal memory 121 may be configured to store computer executable program code, and the executable program code includes an instruction. The processor 110 runs the instruction stored in the internal memory 121, to execute various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, audio data and a phone book) and the like created in a use process of the electronic device 100. In addition, the internal memory 121 may include a high-speed random access memory, and may further include a non-volatile memory such as at least one magnetic disk storage device, a flash memory, or a universal flash storage (UFS).

The electronic device 100 can implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is listened to by using the electronic device 100, the receiver 170B may be put close to a human ear to listen to a speech.

The microphone 170C, also referred to as a "mike" or a "microphone", is configured to convert a sound signal into an electrical signal. When making a call or sending speech information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and recognize a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messaging application icon, an instruction for viewing an SMS message is performed. When a touch operation whose touch operation intensity is greater than or equal to the first pressure threshold is performed on the messaging application icon, an instruction for creating an SMS message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transfer the detected touch operation to the application processor to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may further be compatible with an external memory card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, an Android system with a layered architecture is used as an example to illustrate a software structure of the electronic device 100.

Figure 3:
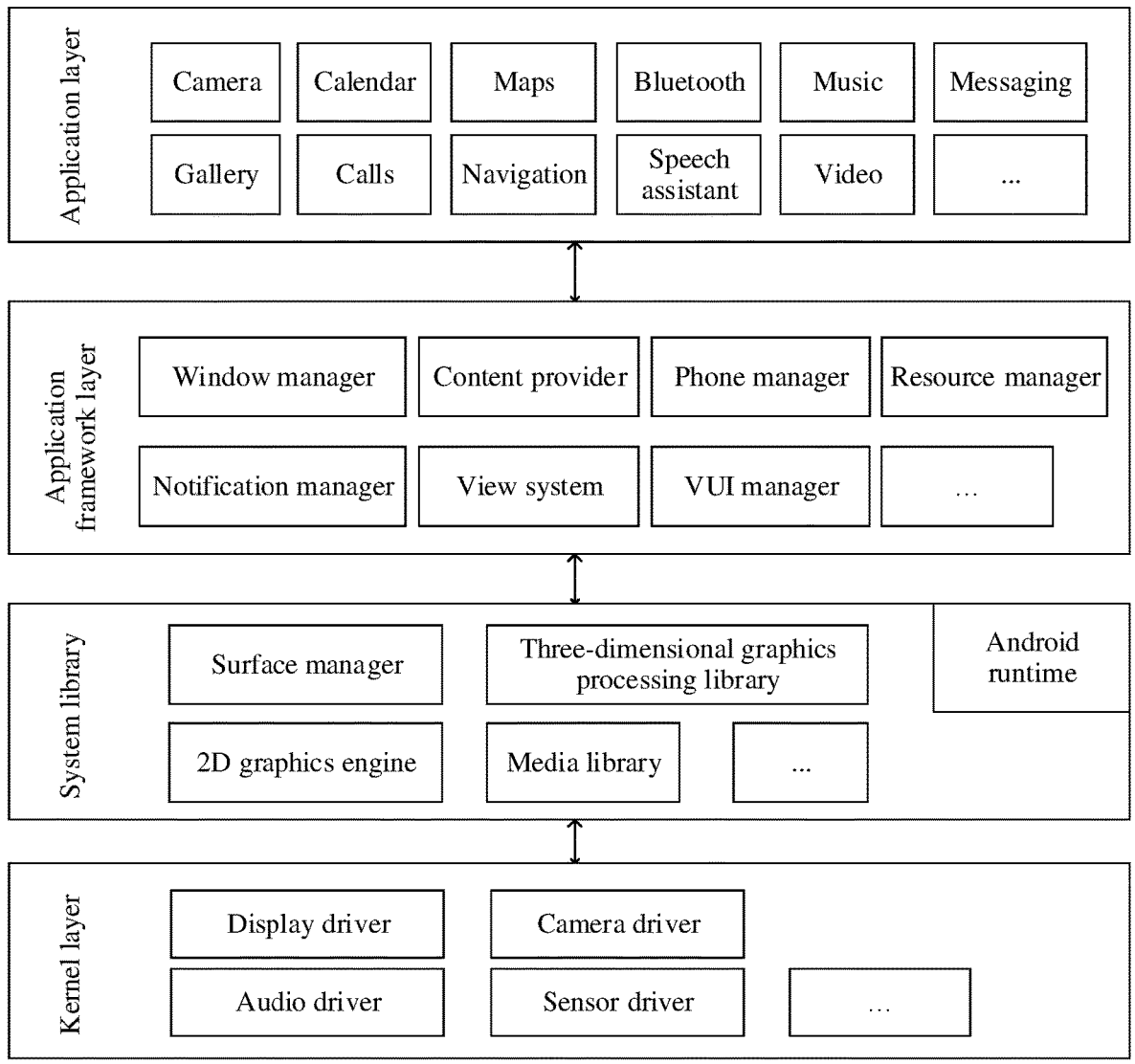
FIG. 3 is a schematic architectural diagram of an operating system in an electronic device according to an embodiment of this application.

FIG. 3 is a block diagram of a software structure of an electronic device 100 according to an embodiment of this application.

In the layered architecture, software is divided into several layers, and each layer has a clear role and task. The layers communicate with each other by using a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application package may include applications such as "camera", "gallery", "calendar", "calls", "maps", "navigation", "Bluetooth", "music", "videos", and "messaging".

In this embodiment of this application, the application layer may further include a speech app having a speech recognition function. The speech app may also be referred to as a speech assistant app sometimes, for example, a speech assistant Xiao E, Xiaoai, or Siri.

After the speech app is enabled, a speech control signal sent by a user may be collected, and the speech control signal is converted into a corresponding speech task. Further, the speech app may invoke an interface of a related application to complete the speech task, so that the user controls the electronic device in a speech manner.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and received, a browsing history and bookmarks, an address book, and the like.

The view system includes visual controls such as a control for displaying a text and a control for displaying a picture.

The view system may be configured to construct an application. A display interface may include one or more views. For example, a display interface including an SMS message notification icon may include a text display view and a picture display view.

The phone manager is configured to provide a communication function for the electronic device 100, for example, management of a call status (including answering or declining).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may be a notification that appears in a top status bar of the system in a form of a graph or a scroll bar text, for example, a notification of an application running in the background, or may be a notification that appears on the screen in a form of a dialog window. For example, text information is displayed in the status bar, an alert sound is played, the electronic device vibrates, or the indicator light blinks.

In this embodiment of this application, the application framework layer further includes a VUI (voice user interface) manager. The VUI manager may monitor a running status of the speech app, or may serve as a bridge between the speech app and another app, and transfer a speech task recognized by the speech app to a related app for execution.

For example, an application at the application layer may provide a configuration file, and a speech task supported by a related interface of the application may be recorded in the configuration file. A music app is used as an example. When installing the music app, the electronic device may store, in the electronic device, a configuration file 1 provided by the music app. The configuration file 1 may record a speech task supported by the music app when the music app displays a music playback interface. For example, the speech task includes playing, pausing, switching to a previous/next song, turn up/down the volume, and the like.

Figure 4:
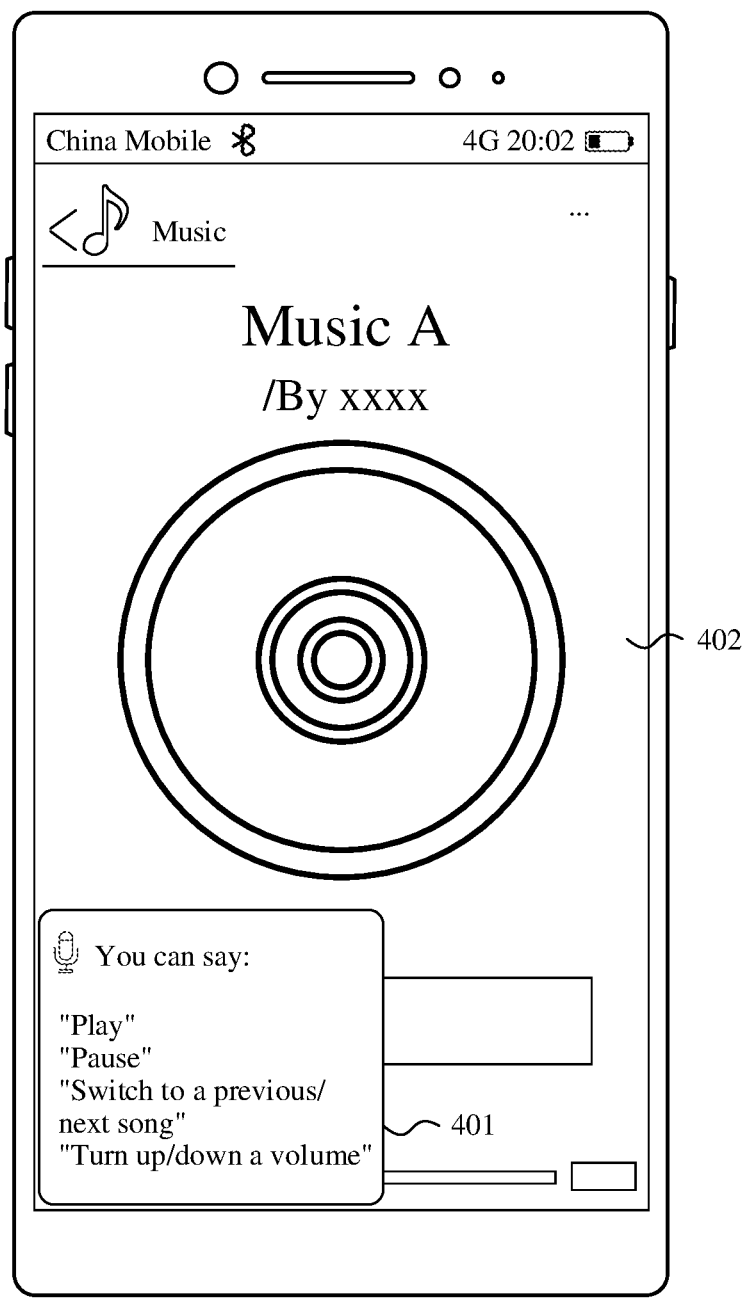
FIG. 4 is a schematic scenario diagram 1 of a speech control method according to an embodiment of this application.

In this case, when the electronic device runs the music playback interface of the music app in the foreground, if it is detected that the user enters a wake-up word "Hello, Xiao E", the electronic device may enable the speech app in the background. After detecting that the speech app is enabled, the VUI manager may obtain the configuration file 1 corresponding to the currently displayed music playback interface. Further, as shown in FIG. 4, the VUI manager may display, in a form of a speech input prompt 401, the speech task recorded in the configuration file 1 on the music playback interface 402 that is running.

In this way, when the user uses the music app, the electronic device may prompt the user with a speech task supported by the current application interface. Subsequently, the user may send a corresponding speech control signal to the electronic device based on the speech input prompt 401 displayed on the music playback interface 402, so as to trigger the electronic device to execute the speech task supported by the current application interface. This can improve speech control efficiency of the speech app in the electronic device, and further improve user experience.

Figure 6:
FIG. 6 is a schematic scenario diagram 2 of a speech control method according to an embodiment of this application.
Figure 7A:
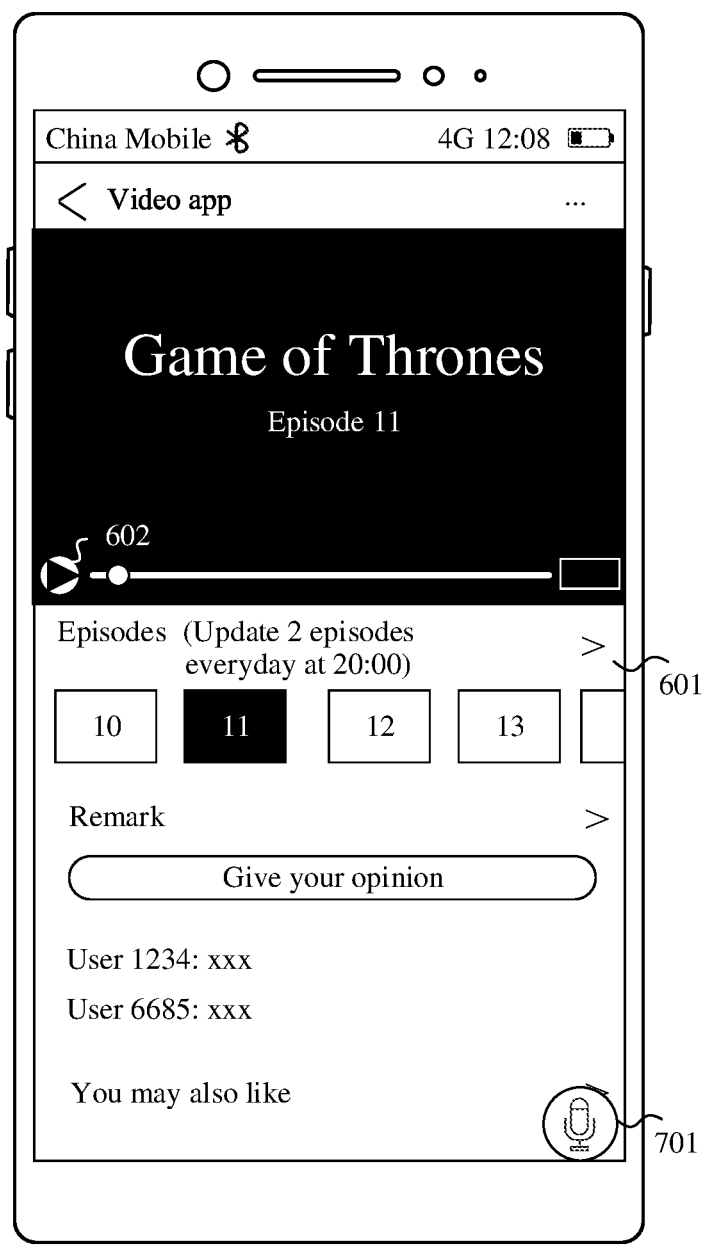
FIG. 7A is a schematic scenario diagram 3 of a speech control method according to an embodiment of this application.
Figure 8:
FIG. 8 is a schematic scenario diagram 4 of a speech control method according to an embodiment of this application.

It should be noted that an application running in the foreground usually refers to an application to which an interface that is being displayed on a screen of a mobile phone belongs. The interface is usually in an expanded state, and the user may interact with the foreground application on the interface. For example, if the mobile phone is displaying an interface of a WeChat app, the application running in the foreground is the WeChat app at this time. For another example, if the music app in FIG. 4 is displayed, in an expanded state, on the screen of the mobile phone, the music app is the foreground application at this time. For another example, if a video app in FIG. 6 is displayed, in an expanded state, on the screen of the mobile phone, the video app is the foreground application at this time. When an application runs in the background, the mobile phone usually does not display an interface of the application in an expanded state on the screen, and the interface of the application is invisible to the user. However, the mobile phone may display an entry (for example, an icon of the application) of the background application on the screen. For example, as shown in FIG. 7A or FIG. 8, the mobile phone may display, in a form of a floating menu, an identifier 701 of the speech app running in the background on the interface of the foreground application. The user may drag the identifier 701 to any location on the current interface. In addition, when the mobile phone displays the identifier 701 of the speech app, the user may still interact with the interface of the foreground application. For example, as shown in FIG. 7A, the user may click a control such as a playback button 602 on an interface 601 of the video app.

Usually, the speech app includes two parts. One part is a speech service (service) running in the background, and is used to collect a sound signal entered by the user, extract the sound signal, and perform text conversion, speech recognition, or the like. The other part is content displayed on the screen of the mobile phone, and is used to display an interface of the speech app, for example, content of a dialog between the user and the speech app. In this embodiment of this application, the speech app running in the background in the mobile phone may be understood as the speech service running in the background in the mobile phone. Certainly, when the speech service runs in the background, the mobile phone may alternatively display information such as the identifier of the speech app in a form of a floating menu and the like. This is not limited in the embodiments of this application.

The Android runtime includes a core library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like. This is not limited in the embodiments of this application.

The following describes in detail a speech control method provided in the embodiments of this application with reference to the accompanying drawings.

Figure 5:
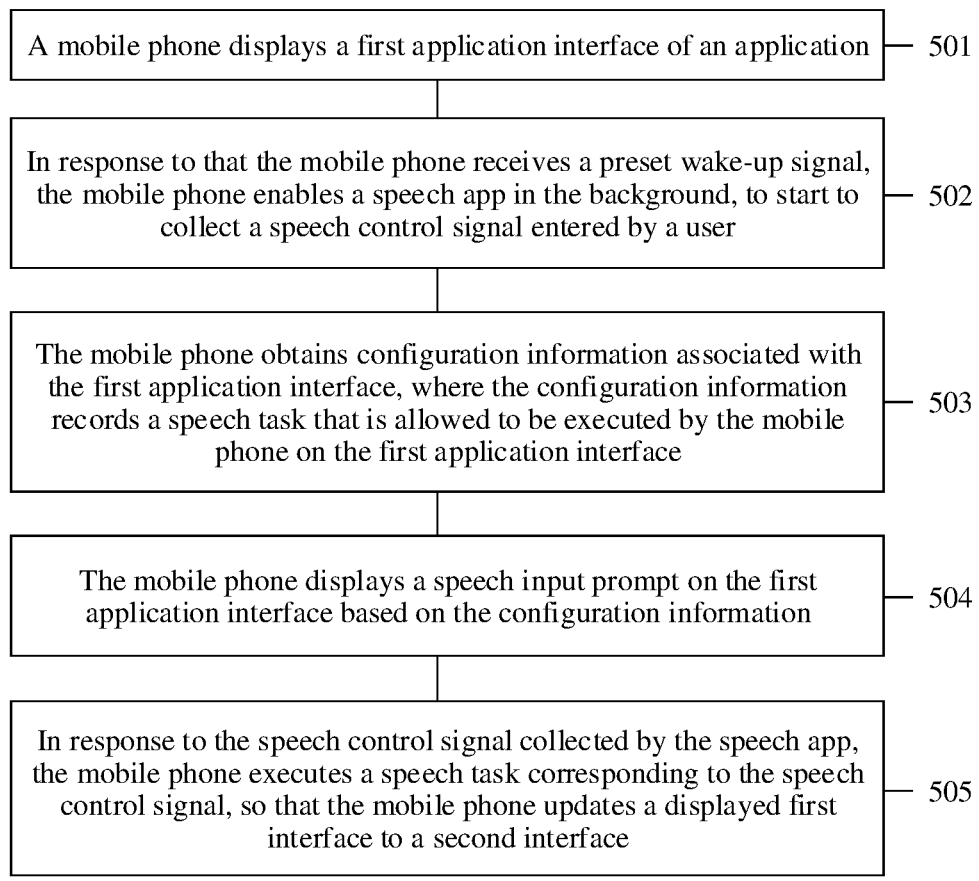
FIG. 5 is a schematic flowchart of a speech control method according to an embodiment of this application.

As shown in FIG. 5, the speech control method provided in this application includes the following steps S501 to S505. Steps S501 to S505 are described by using an example in which a mobile phone is used as an electronic device.

S501: The mobile phone displays a first interface of an application, where the first interface includes one or more controls used to update the first interface.

Usually, one or more applications are installed in the mobile phone. After detecting an operation of enabling an application by a user, the mobile phone may start to run the application as a foreground application. In this case, the mobile phone may display an interface of the application on a touchscreen. Using the first interface as an example, when displaying the first interface of the application, the mobile phone usually displays the first interface in an expanded state, so that the user can interact with the application on the first interface.

The first interface displayed by the mobile phone usually includes the one or more controls. Usually, an element presented in a GUI (graphical user interface) may be referred to as a control, and the control can provide a specific operation for a user. As shown in FIG. 6, the first interface displayed by the mobile phone is a playback interface 601 of a video app. A plurality of controls such as a playback button, a return button, and an input box are disposed on the playback interface 601. The user may operate these controls to update display content of the mobile phone, so that the mobile phone displays an updated second interface. For example, if detecting that the user clicks the return button on the playback interface 601, the mobile phone displays a previous-level menu (that is, the second interface) of the playback interface 601 in response to the click operation. For another example, if detecting that the user clicks the playback button on the playback interface 601, the mobile phone plays a video on the playback interface 601 in response to the click operation. In this case, the interface displayed on the mobile phone is updated from the first interface to the second interface.

S502: In response to that the mobile phone receives a preset wake-up signal, the mobile phone enables a speech app in the background, to start to collect a speech control signal entered by the user.

For example, before enabling the speech app, the mobile phone may set a microphone to an always on (always on) state. In this case, when the mobile phone displays an interface (for example, the first interface) of an application, the microphone of the mobile phone collects a sound signal at a specific operating frequency.

As shown in FIG. 6, the mobile phone is displaying the playback interface 601 (that is, the first interface) of "Game of Thrones" in the video app. When the microphone collects a sound signal, the mobile phone may further recognize whether the collected sound signal is the preset wake-up signal. For example, after the user sends a sound signal "Hello, Xiao E", the mobile phone may collect the sound signal by using the microphone. If the mobile phone recognizes that the sound signal is the preset wake-up signal, it indicates that at this time, the user expects to complete a related speech task by using a speech recognition function provided by the speech app. In this case, to avoid blocking the first interface (for example, the playback interface 601) that is being displayed by the mobile phone, the mobile phone may enable the speech app in the background. For example, as shown in FIG. 7A, after enabling the speech app in the background, the mobile phone may display an icon 701 of the speech app on the playback interface 601. The icon 701 is used to indicate that the speech app is running in the background of the mobile phone. Because the speech app is running in the background of the mobile phone, the mobile phone may still respond to various operations performed by the user on the playback interface 601, for example, an operation of clicking the playback button by the user. Certainly, it may be alternatively preset that when enabling the speech app in the background, the mobile phone cannot respond to various operations performed by the user on the first interface (for example, the playback interface 601). This is not limited in the embodiments of this application.

After the mobile phone enables the speech app in the background, the user may start to enter, to the speech app, a speech control signal that is expected to be executed by the mobile phone, for example, making a call to a contact Sam, or starting to play a video. Therefore, after enabling the speech app in the background, the mobile phone may continue to use the microphone to collect the speech control signal entered by the user. For example, the mobile phone may set that the microphone is automatically enabled for five seconds after the speech app is enabled, to collect a speech control signal entered by the user in the five seconds. For another example, the mobile phone may set the icon 701 of the speech app as an on/off button of the microphone. If detecting that the user clicks the icon 701, the mobile phone may enable the microphone for five seconds, to collect a speech control signal entered by the user in the five seconds. For another example, if detecting that the user clicks the icon 701, the mobile phone enables the microphone, and keeps the microphone in a working state, to collect the speech control signal entered by the user. After detecting that the user clicks the icon 701 again, the mobile phone may disable the microphone.

It should be noted that the wake-up signal may include another signal in addition to a wake-up word entered by the user through speech. For example, the wake-up signal may be a click signal of the user on a button, or the wake-up signal may be a touch gesture of the user. This is not limited in the embodiments of this application.

Figure 7B:
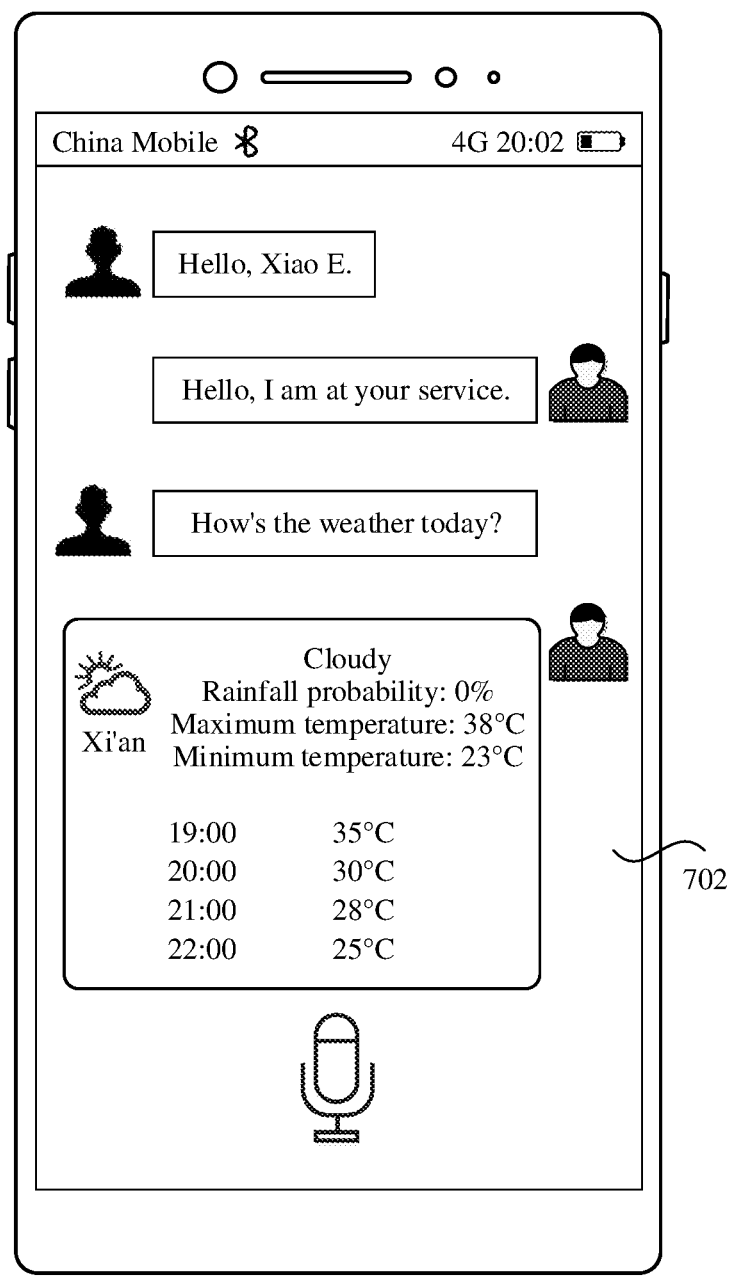
FIG. 7B is a schematic diagram of a scenario shown when a speech application runs in the foreground in the prior art.

In addition, the mobile phone may preset applications that are allowed to use the speech app. For example, it may be set that a WeChat app has permission to use the speech app, but an Alipay app does not have the permission to use the speech app. In this case, when the mobile phone runs, in the foreground, the application having the permission to use the speech app, if the mobile phone receives the wake-up signal entered by the user, the mobile phone may enable the speech app in the background. Correspondingly, if the mobile phone runs, in the foreground, an application or an interface of an application having no permission to use the speech app, after the mobile phone receives the wake-up signal entered by the user, the mobile phone may run the speech app in the foreground. As shown in FIG. 7B, when running the speech app in the foreground, the mobile phone may display an interface 702 of the speech app in an expanded state. The interface 702 may include controls of the speech app. On the interface 702, the mobile phone may display content of a dialog between the user and the speech app.

S503: The mobile phone obtains a configuration file associated with the first interface, where the configuration file records a speech task that is allowed to be executed by the mobile phone on the first interface.

Because the user enables the speech app when the mobile phone displays the first interface, after enabling the speech app, the user probably wants to execute a speech task related to the first interface by using the speech app. For example, the first interface is the playback interface 601. When the mobile phone displays the playback interface 601, if the mobile phone detects the wake-up signal entered by the user, it indicates that the user probably needs to perform a specific operation on an operation button on the playback interface 601 by using the speech app. For example, when it is inconvenient for the user to click a playback button 602 on the playback interface 601 with either hand, the user may want to implement, by using a speech control function of the speech app, an operation of displaying the video "Game of Thrones" on the playback interface 601.

In this embodiment of this application, the mobile phone may pre-store a configuration file of each application. For example, each application corresponds to one or more configuration files. For one configuration file, the configuration file records a speech task supported by the speech app on different interfaces of one application. One configuration file may alternatively only record a speech task supported by the speech app on one interface of one application. Using the foregoing video app as an example, a developer of the video app may set a configuration file 1 of the playback interface and a configuration file 2 of a home page in an installation package of the video app. The configuration file 1 records a speech task that is allowed to be executed by the speech app on the playback interface of the video app, for example, playing, fast forwarding, or switching to a next episode. The configuration file 2 records a speech task that is allowed to be executed by the speech app on the home page of the video app, for example, viewing a historical playback record or searching for a keyword. When installing the video app, the mobile phone may locally store the configuration file 1 and the configuration file 2 that are provided in the installation package of the video app.

Alternatively, the mobile phone may automatically generate the configuration file 1 and the configuration file 2. For example, when running the playback interface 601 of the video app, the mobile phone may obtain buttons included in the playback interface 601 and attributes of the buttons. Using the playback button 602 as an example, an attribute of the playback button 602 is that the playback button 602 is of a clickable button type, and clicking the playback button 602 may be used to start playing a video or stop playing a video. In this case, the mobile phone may record, in the configuration file 1, a playback task and a pause task as speech tasks supported by the playback interface 601. Similarly, the mobile phone records, in the configuration file 1, a speech task corresponding to another button on the playback interface 601, and finally generates the configuration file 1 corresponding to the playback interface 601.

For example, the configuration file may be a file in an XML (Extensible Markup Language, extensible markup language) format. For example, specific content of the configuration file 1 is as follows:

```
<VoiceIntentList>
    <VoiceIntent //Speech task 1
    intentId="@id/intent_power" //The speech task 1 is the
    playback task
    bindViewId="@id/power" //A button corresponding to the speech
task 1 is the playback button
    voiceOnClick="voiceSwitchPower" //An operation
corresponding
to the speech task 1 is clicking the playback button
    voiceTags="@string/power_controller"/>   //Remarks:
(Optional) power control
    <VoiceIntent    //Speech task 2
    ...>
    <VoiceIntent    //Speech task 3
    ...>
```

It can be learned that the configuration file 1 records one or more speech tasks that are allowed to be executed by the speech app on the playback interface of the video app. The speech task 1 is used as an example. The intentId field records that specific content of the speech task 1 is the playback task. The bindViewId field records that a button on which the speech task 1 is performed is the playback button on the playback interface. The voiceOnClick field records that a specific operation performed on the mobile phone when speech task 1 is performed is clicking the playback button.

To be specific, the configuration file 1 further records a correspondence between the speech task 1 and a touch event of clicking the playback button on the playback interface. For the mobile phone, when the mobile phone receives a speech control signal for entering the playback task by the user, it is equivalent to that the mobile phone detects that the user clicks the playback button on the playback interface. Optionally, the voiceTags field records the remark on the speech task 1. For example, some users are used to call a playback operation as the power control. Therefore, the power control may be remarked as another expression manner of the playback task. Subsequently, if detecting a speech control signal related to the power control entered by the user, the mobile phone may determine, with reference to the remark of the speech task 1, that a speech task that the user expects to execute is the playback task.

If the mobile phone subsequently determines that the speech control signal entered by the user corresponds to the playback task, the mobile phone may execute, based on the bindViewId field and the voiceOnClick field in the configuration file 1, a related function (for example, a voiceSwitchPower callback function) corresponding to clicking the playback button in the video app. In this way, a function of controlling, in the video app by using the speech control signal, the mobile phone to execute the playback task is implemented.

Specifically, in step S503, after the mobile phone enables the speech app at an application layer, the speech app may report an enabling event of the speech app to a VUI manager at an application framework layer. After detecting the enabling event, the VUI manager may obtain the configuration file associated with the currently displayed first interface. For example, the VUI manager may first determine that an interface running in the foreground is the playback interface 601 of the video app. Then, the VUI manager may read, based on an identifier of the playback interface 601, the configuration file 1 that is set in the video app for the playback interface 601. The configuration file 1 records the one or more speech tasks that are allowed to be executed by the speech app on the playback interface of the video app.

S504: The mobile phone displays a speech input prompt on the first interface based on the configuration file.

After enabling the speech app on the first interface, the user may not know specific speech tasks that can be executed by the speech app on the first interface. Consequently, the user cannot accurately use various speech recognition functions provided by the speech app. In step S504, after the mobile phone obtains the configuration file associated with the first interface, because all speech tasks recorded in the configuration file can be executed by the speech app on the first interface, the mobile phone may display the one or more speech tasks in the configuration file as speech input prompts on the first interface, to prompt the user to send accurate speech control signals to control functions on the first interface.

For example, after obtaining the configuration file 1 of the playback interface 601, the VUI manager may display, on the playback interface 601 in a form of a speech input prompt, the speech task recorded in the configuration file 1. As shown in FIG. 8, the mobile phone may display one or more speech input prompts 801 near the icon 701 of the speech app. Each speech input prompt 801 corresponds to one speech task in the configuration file 1. Usually, each speech task is associated with one or more controls on the playback interface 601. Therefore, each speech input prompt is also associated with the one or more controls on the first interface. For example, when the playback task is recorded in the configuration file 1, and the playback task corresponds to the playback button on the playback interface 601, the mobile phone may display a corresponding speech input prompt "play". When a fast forward task is recorded in the configuration file 1, and the fast forward task corresponds to a fast forward button on the playback interface 601 and a slider on a video progress bar, the mobile phone may display a corresponding speech input prompt "fast forward x seconds", where x is any positive integer, for example, "fast forward 10 seconds" in FIG. 8.

When there are a relatively large quantity of speech input prompts, a "more" button 802 may be displayed on the playback interface 601. If detecting that the user clicks the "more" button 802, the mobile phone may completely display a hidden speech input prompt 801 on the playback interface 601. Before the user clicks the "more" button, the mobile phone may display, based on a use habit of the user, only several speech input prompts 801 that are most frequently used by the user. Further, the mobile phone may intelligently recognize a speech of the user. For example, in the speech input prompt 801 shown in FIG. 8, there is the speech prompt "fast forward 10 seconds". If a speech instruction provided by the user is "fast forward 15 seconds", the mobile phone may still understand an intention of the user by splitting the instruction into two instructions: "fast forward" and "15 seconds", and fast forward the video for 15 seconds.

Figure 9B:
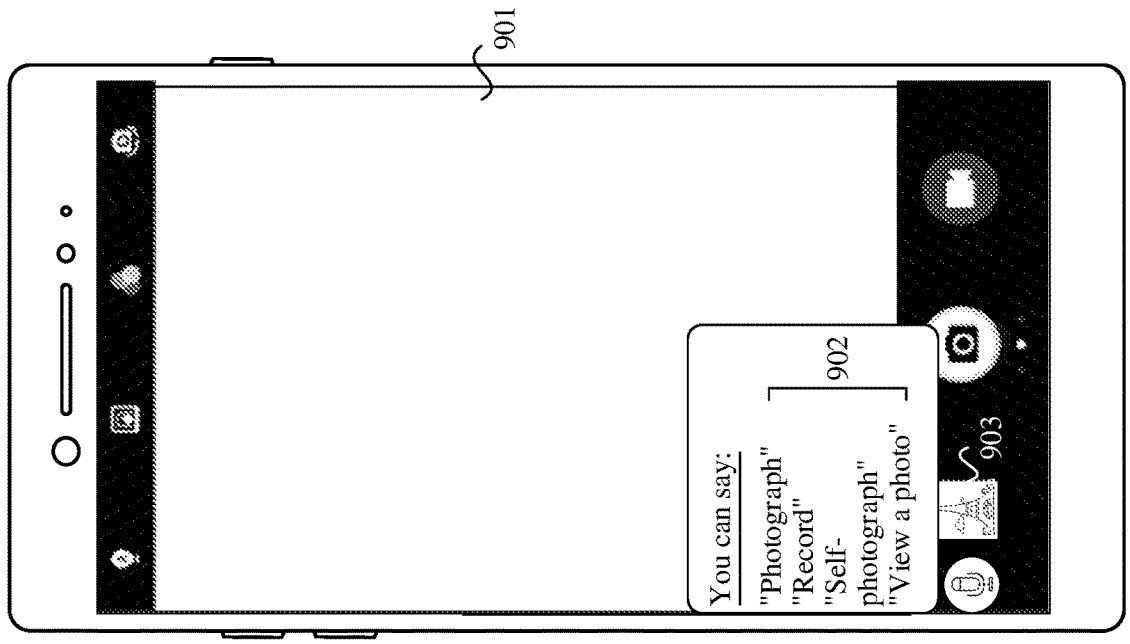
FIG. 9(a) and FIG. 9(b) are a schematic scenario diagram 5 of a speech control method according to an embodiment of this application.
Figure 9A:
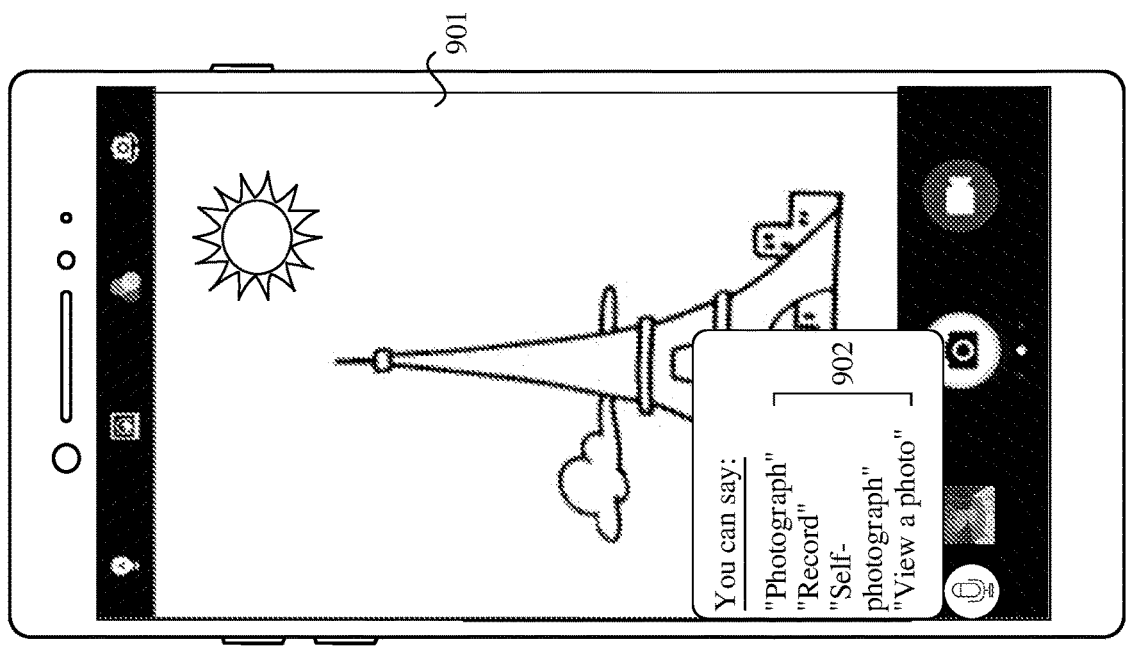

In the foregoing embodiment, an example in which the speech input prompt 801 is displayed on the playback interface 601 is used for description. It may be understood that when the mobile phone displays an interface of another application, the mobile phone may also prompt, in a form of speech input prompt, the user with a speech task supported by the current interface according to the foregoing method. For example, as shown in FIG. 9(a), when the mobile phone displays a photographing interface 901 of a camera app, if the mobile phone detects that the mobile phone enables the speech app in the background, the mobile phone may obtain a configuration file associated with the photographing interface 901 of the camera app, and further display a speech task in the configuration file on the photographing interface 901 in a form of a speech input prompt 902. For example, the speech input prompt 902 may include "photographing", "recording", "self-photographing", "viewing a photo", and the like. The "photographing" corresponds to a photographing button on the photographing interface 901. The "recording" corresponds to a recording button on the photographing interface 901. The "self-photographing" corresponds to a button for enabling a front-facing camera that is on the photographing interface 901. The "viewing a photo" corresponds to a photo thumbnail 903 on the photographing interface 901. All speech tasks corresponding to the speech input prompts 902 are tasks that can be executed by the speech app on the photographing interface 901.

Figure 10:
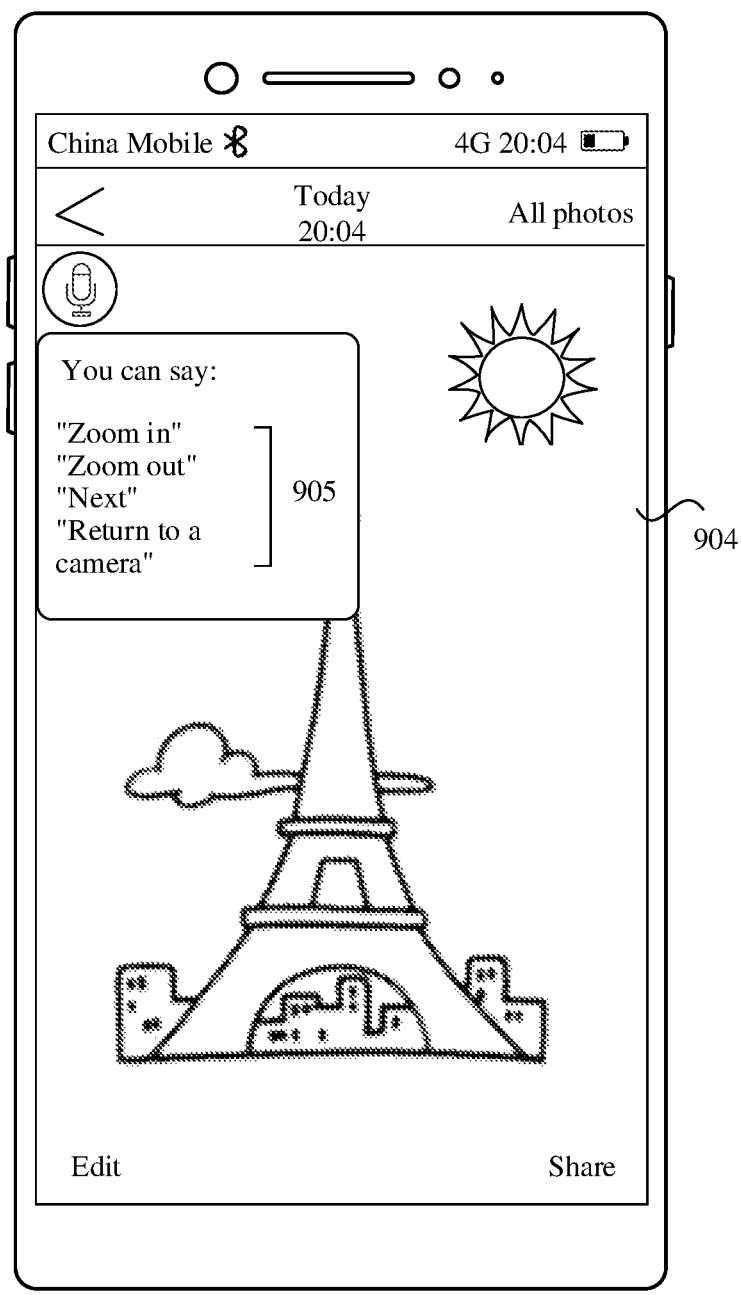
FIG. 10 is a schematic scenario diagram 6 of a speech control method according to an embodiment of this application.

For example, when the mobile phone displays the photographing interface 901 shown in FIG. 9(a), if the mobile phone detects that the user enters the speech control signal "photographing", the mobile phone may invoke the speech app to perform a photographing operation corresponding to the speech control signal in response to the speech control signal. After completing the photographing operation, the mobile phone may continue to display the photographing interface 901 of the camera app. In this case, as shown in FIG. 9(b), a photo thumbnail 903 obtained by the mobile phone in previous photographing may also be displayed on the photographing interface 901. In addition, the mobile phone may continue to display the speech input prompt 902 corresponding to the photographing interface 901. In this case, if the user wants to view the photo obtained in the previous photographing, the user may input the speech control signal "viewing a photo" to the mobile phone. In response to the speech control signal, as shown in FIG. 10, the mobile phone may enable a gallery app to display a browsing interface 904 of a latest picture. In addition, the mobile phone may obtain a configuration file associated with the browsing interface 904, and farther display a speech task in the configuration file on the browsing interface 904 in a form of a speech input prompt 905. For example, the speech input prompt 905 may include "zoom in", "zoom out", "next", "return to the camera", and the like. The photo displayed on the browsing interface 904 may also be used as a control, and the speech input prompts 905 such as "zoom in", "zoom out", and "next" all correspond to the photo. The "zoom in" corresponds to performing a zoom-in operation on the photo. The "zoom out" corresponds to performing a zoom-out operation on the photo. The "next" corresponds to performing a slide operation on the photo. If the browsing interface 904 includes a button used to display a next photo, the "next" may further correspond to the button used to display the next photo.

Further, if the mobile phone has a face recognition function, the mobile phone may further automatically recognize a face included in the browsing interface 904, for example, a user A. Further, if a received speech control signal entered by the user is "amplifying the user A", the mobile phone may zoom in the currently displayed picture by using a location of the user A (for example, a face of the user A) as a center.

In other words, after the mobile phone displays an interface of an application and enables the speech app in the background, the mobile phone may prompt the user with a speech task that can be executed by the speech app on the current interface. In this way, the user can accurately learn how to use the speech app to control various functions on the current interface through speech. This improves use efficiency of the speech app.

In addition, speech input prompts displayed by the mobile phone on the interface of the same application may also change dynamically. For example, if the mobile phone detects that a video is being played on the playback interface 601, the mobile phone may hide the speech input prompt "play". Correspondingly, if detecting that the user pauses playing the video on the playback interface 601, the mobile phone may display the speech input prompt "play", and the mobile phone may hide the speech input prompt "pause". This is not limited in the embodiments of this application.

Figure 11:
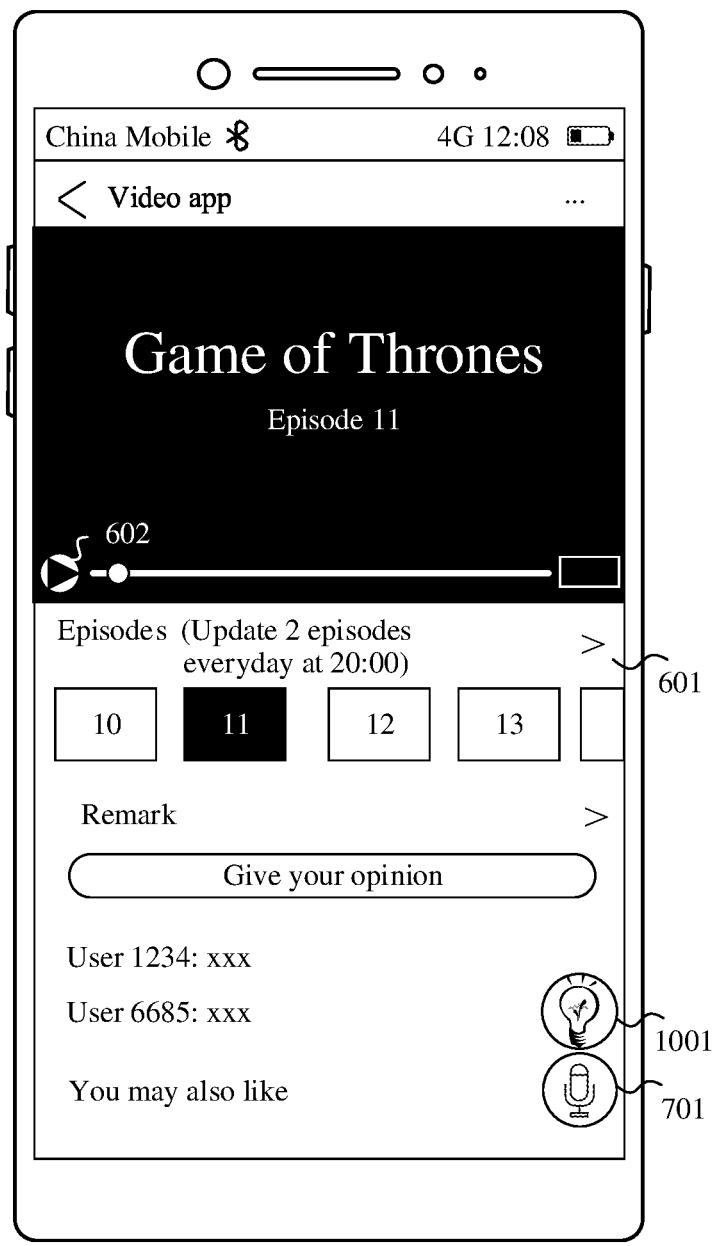
FIG. 11 is a schematic scenario diagram 7 of a speech control method according to an embodiment of this application.

For example, after enabling the speech app, the mobile phone may immediately display a speech input prompt related to the first interface. Alternatively, after enabling the speech app, if the mobile phone collects, within a specific time (for example, two seconds), no speech control signal entered by the user, it indicates that the user may not know how to use the speech app in this case. Therefore, the mobile phone may display a speech input prompt related to the first interface. Alternatively, as shown in FIG. 11, after enabling the speech app, the mobile phone may display a prompt button 1001 on the first interface (for example, the playback interface 601). If detecting that the user clicks the prompt button 1001, the mobile phone may display, on the playback interface 601 according to the foregoing method, the related speech input prompt 801 shown in FIG. 8.

After displaying the speech input prompt on the first interface for a period of time (for example, three seconds), the mobile phone may automatically hide the speech input prompt. Alternatively, after the mobile phone displays the speech input prompt on the first interface, if the mobile phone collects, within a specific time, no speech control signal entered by the user, or detects no input event of the user on the touchscreen within a specific time, the mobile phone may automatically hide the speech input prompt on the first interface.

It should be noted that the step (that is, step S504) the mobile phone displays the speech input prompt on the first interface is an optional step. In other words, after enabling the speech app in the background, the mobile phone may not prompt the user with the speech task supported by the speech app on the current interface. This is not limited in the embodiments of this application.

Regardless of whether the mobile phone displays the speech input prompt, after the mobile phone enables the speech app in the background, the user can enter the speech control signal to the mobile phone by using the speech app. In this case, after the speech app collects the speech control signal entered by the user, the following step S505 may continue to be performed.

S505: In response to the speech control signal collected by the speech app, the mobile phone executes a speech task corresponding to the speech control signal, so that the mobile phone updates the displayed first interface to the second interface.

Still using the playback interface 601 as an example, after the mobile phone displays the speech input prompt 801 on the playback interface 601, the user may input a corresponding speech control signal to the mobile phone based on the speech input prompt 801. In this case, the speech app still runs in the background. Therefore, the speech app may collect, by using the microphone, the speech control signal entered by the user. For example, after the user enters a speech control signal such as "play" or "start to play", the speech app may convert, by using a preset speech recognition algorithm, the speech control signal entered by the user into a text signal and perform semantic understanding, to recognize an actual speech task corresponding to the speech control signal. Further, the speech app may report the recognized actual speech task to the VUI manager at the application framework layer. The VUI manager compares the actual speech task with the speech task recorded in the configuration file 1 obtained in step S503, so as to determine whether the speech control signal entered by the user is the speech task supported in the configuration file 1.

Figure 12:
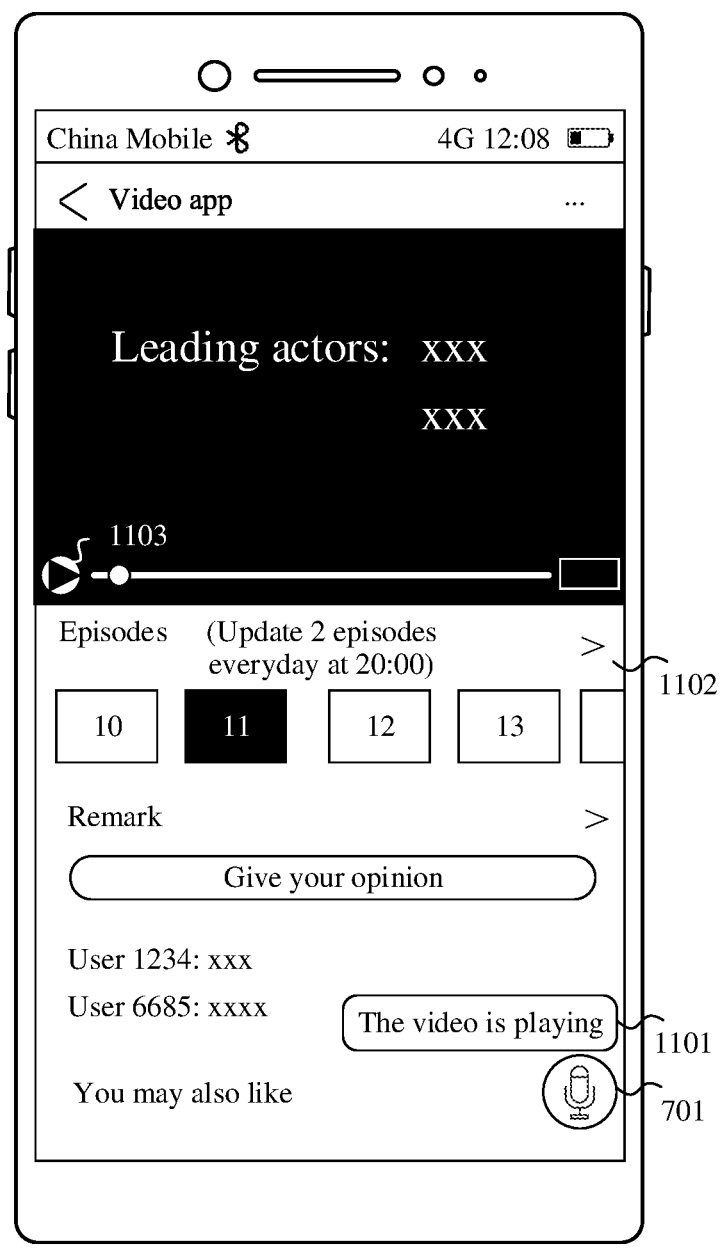
FIG. 12 is a schematic scenario diagram 8 of a speech control method according to an embodiment of this application.

If the speech control signal entered by the user is a speech task in the configuration file 1, for example, the speech control signal "play" entered by the user is the speech task 1 in the configuration file 1, the VUI manager may execute, based on the configuration file 1, a touch event corresponding to the speech task 1. Still using the speech task 1 as an example, the configuration file 1 records that the speech task 1 corresponds to the playback button, and specifically corresponds to the touch event of clicking the playback button on the playback interface. It indicates that the user expects, by entering the speech control signal "play", to control the playback button 602 on the playback interface 601 to implement a play function. In this case, the VUI manager may execute, based on the bindViewId field and the voiceOnClick field in the configuration file 1, a related function (for example, the voiceSwitchPower callback function in the speech task 1) corresponding to clicking the playback button in the video app, so as to implement, in the video app, the speech task corresponding to the speech control signal "play". In this case, as shown in FIG. 12, after the playback button 602 on the playback interface 601 is clicked, video content played by the mobile phone changes. In addition, the originally displayed playback button 602 may be updated to a pause button 1103. In other words, the interface displayed by the mobile phone is updated from the first interface to a second interface 1102.

In addition, as shown in FIG. 12, after the speech task corresponding to the speech control signal "play" is implemented, the speech app may further display response information 1101 for the speech control signal entered by the user, to prompt the user that the response to the speech control signal is complete. Subsequently, the user may further continue to communicate with the speech app to complete a response to another speech control signal.

Alternatively, after the mobile phone determines that the speech control signal entered by the user is the speech task 1 in the configuration file 1, because the speech task 1 records that the task is specifically the playback task and a button used for the task is the playback button, the VUI manager may further report a click event of the playback button to the video app. For example, the VUI manager may carry coordinates of the playback button in the click event to report the coordinates to the video app. Further, in response to the click event, the video app may invoke a related function at the framework layer to execute the playback task for playing a video.

It can be learned that in this embodiment of this application, a corresponding configuration file may be set for each interface in the application. The configuration file records a speech task supported by a corresponding interface and a specific touch event corresponding to the speech task. In this way, when running an interface of the application, the mobile phone may convert, based on the configuration file of the interface, the speech control signal entered by the user into a corresponding touch event, and then execute the touch event, so as to implement a function of controlling each operation button on the interface of the application through speech. In this way, the mobile phone can implement, on each interface of the application, a speech control function for each operation button on the interface. This improves speech control efficiency of the mobile phone and user experience.

In addition, after determining that the speech control signal entered by the user is the playback task in the configuration file 1, the mobile phone may further display, on the playback interface 601, an animation effect of the touch control operation of clicking the playback button 602, to visually prompt the user that the mobile phone is responding to the speech control signal entered by the user. For another example, when the user enters, through speech, a text (for example, a phone number) on an interface that is being displayed on the mobile phone, the mobile phone may also present, on the interface, a process of entering the phone number to the user, so that the user obtains good user experience in both a GUI (graphical user interface) and a VUI.

For example, after the mobile phone determines that the speech control signal entered by the user is the playback task in the configuration file 1, the mobile phone may simulate a display process of the click event on the touchscreen by executing the following code:

```
new OnVoiceClickListener{
    public void onVoiceClick(final View view){
        view.setPressed(true); //Simulate finger pressing and
        display a pressed state
        view.performClick( ); //Execute a callback function correspond-
        ing to a click event
        view.postDelayed(new RealsePressed(view),500); //After 500
        ms, simulate
finger release and display a release state
    }
}
```

Correspondingly, if the speech control signal entered by the user does not belong to a speech task in the configuration file of the first interface, it indicates that the mobile phone does not support executing, on the current first interface, the speech control signal sent by the user. The mobile phone may prompt, by using the speech app, the user that the speech task cannot be completed or prompt the user to re-enter a speech task.

Figure 13:
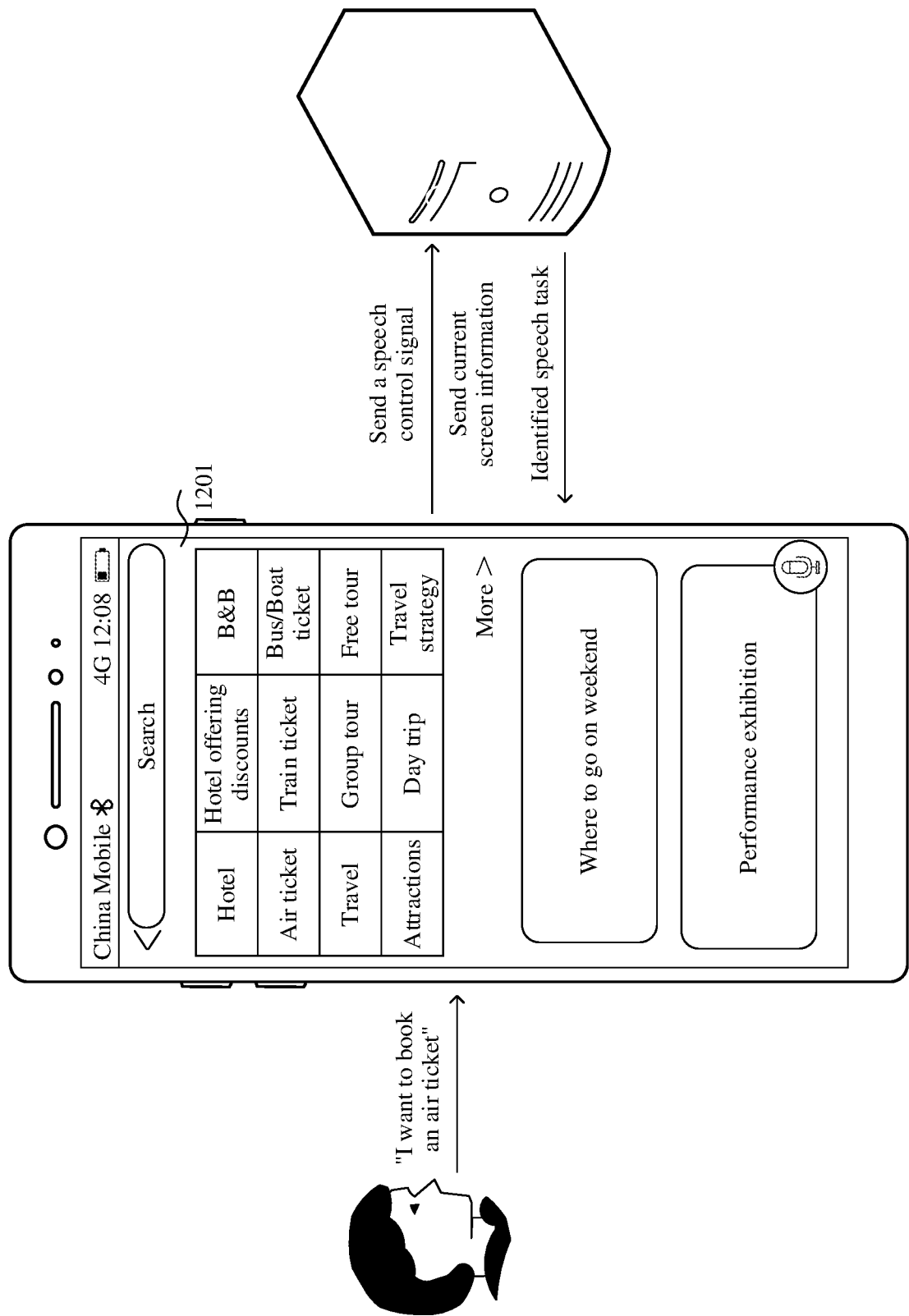
FIG. 13 is a schematic scenario diagram 9 of a speech control method according to an embodiment of this application.

In some other embodiments, as shown in FIG. 13, after collecting, by using the speech app, the speech control signal entered by the user, the mobile phone may further send the speech control signal to a server. For example, when the speech control signal entered by the user is relatively complex, and consequently it is difficult for the speech app to recognize the speech control signal, the mobile phone may send the speech control signal entered by the user to the server. The server performs semantic recognition and understanding on the speech control signal entered by the user, to recognize an actual speech task corresponding to the speech control signal. Subsequently, the server may send the recognized actual speech task to the mobile phone, so that the mobile phone compares the actual speech task with a speech task in a corresponding configuration file, to determine whether the speech control signal entered by the user is the speech task supported in the configuration file.

For example, in this embodiment of this application, in addition to sending, to the server, the speech control signal entered by the user, the mobile phone may further send interface information of the first interface to the server. For example, the interface information of the first interface may be an identifier of the first interface, or may be a page type (for example, a settings interface or a chat interface) of the first interface, or may be a type (for example, a video application) of the application to which the first interface belongs, a package name (package name), or the like.

For example, both a Ctrip app and a Booking app are installed in the mobile phone of the user. The Booking app is one of default applications used by the speech app in the mobile phone. Still as shown in FIG. 13, the mobile phone currently displays a home page 1201 of the Ctrip app. When the mobile phone enables the speech app in the background, the speech app collects a speech control signal entered by the user "I want to book an air ticket". Further, the mobile phone may send, to the server, the speech control signal collected by the speech app. In addition, the mobile phone may further send interface information (for example, a package name of the Ctrip app) of the currently running home page 1201 to the server. In this way, the server may perform speech recognition on the speech control signal "I want to book an air ticket" with reference to the interface information, and recognize that an actual speech task sent by the user is booking an air ticket by using the Ctrip app instead of the Booking app. In this case, after the server sends the recognized actual speech task to the mobile phone, the mobile phone may automatically enable an air ticket search interface of the Ctrip app based on the actual speech task in response to the speech control signal "I want to book an air ticket".

Correspondingly, if an interface currently displayed by the mobile phone is not an interface of the Ctrip app, for example, when the mobile phone currently displays a desktop (which may also be referred to as a home screen, homescreen), if the mobile phone enables the speech app in the background, and the speech app collects the speech control signal entered by the user "I want to book an air ticket", the mobile phone may send, to the server, the speech control signal collected by the speech app. In addition, the mobile phone may further send interface information of the currently running desktop to the server. In this way, the server may perform speech recognition on the speech control signal "I want to book an air ticket" with reference to the interface information, and recognize that an actual speech task sent by the user is booking an air ticket by using the default Booking app, instead of booking an air ticket by using the Ctrip app. In this case, after the server sends the recognized actual speech task to the mobile phone, the mobile phone may automatically enable an air ticket search interface of the Booking app based on the actual speech task in response to the speech control signal "I want to book an air ticket".

In other words, in this embodiment of this application, the mobile phone may actively send interface information of a running application to the server. Because the interface information can reflect a current actual use scenario of the mobile phone, the server may more accurately perform, with reference to the interface information, speech recognition on the speech control signal entered by the user. In this way, the actual speech task sent by the user is more accurately determined.

Figure 14:
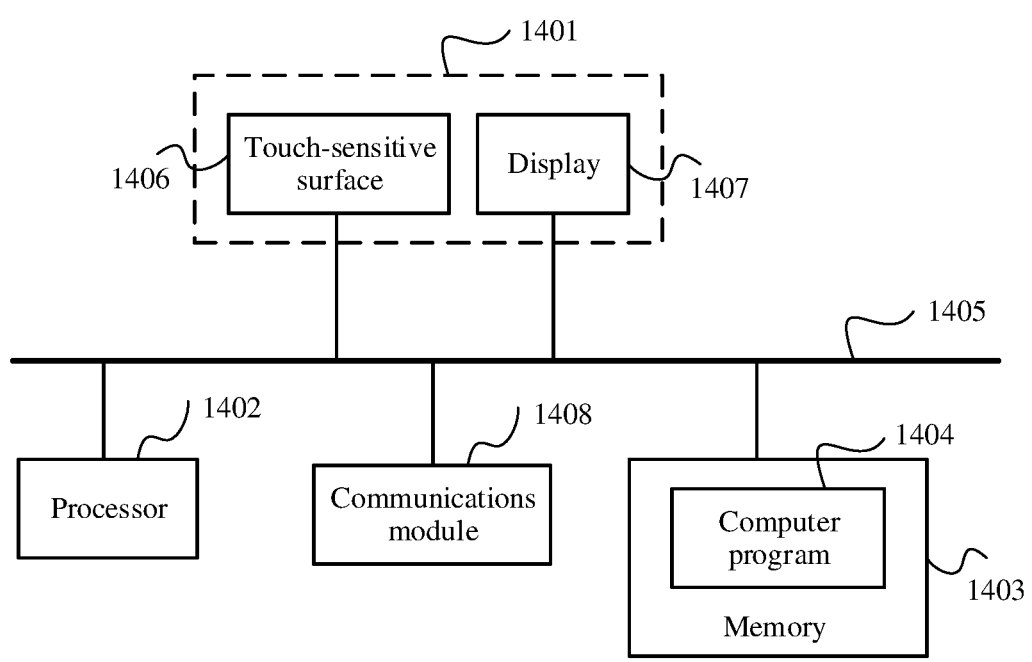
FIG. 14 is a schematic structural diagram 2 of an electronic device according to an embodiment of this application.

As shown in FIG. 14, an embodiment of this application discloses an electronic device, including a touchscreen 1401, where the touchscreen 1401 includes a touch-sensitive surface 1406 and a display 1407, one or more processors 1402, a memory 1403, a communications module 1408, one or more applications (not shown), one or more computer programs 1404, where the foregoing components may be connected by using one or more communications buses 1405. The one or more computer programs 1404 are stored in the memory 1403, and are configured to be executed by the one or more processors 1402. The one or more computer programs 1404 include an instruction. The instruction may be used to perform the steps in the foregoing embodiments. For example, the instruction may be used to perform the steps shown in FIG. 5.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An electronic device, comprising:
a touchscreen, wherein the touchscreen comprises a touch-sensitive surface and a display;
one or more processors; and
one or more non-transitory memories storing one or more computer programs for execution by the one or more processors, the one or more computer programs including instructions to:
display a first interface of a first application, wherein the first interface comprises at least one control used to update the first interface, and wherein a speech application for speech recognition is running in a background when the first interface is displayed;
display, on the first interface, M speech input prompts, wherein each speech input prompt of the M speech input prompts corresponds to one control on the first interface, and wherein M is an integer greater than 0;
acquire a first speech control signal entered by a user, wherein the first speech control signal corresponds to a first speech input prompt of the M speech input prompts, wherein the first speech input prompt corresponds to a first control on the first interface, and wherein the first control is one of the at least one control of the first interface;
display on the first interface, in response to the first speech control signal, a first animation effect generated by simulating a touch operation of triggering the first control;
display, after displaying the animation effect, a second interface of the first application in response to the first speech control signal, wherein the second interface is the same as an interface obtained through the first control being triggered by a touch operation;
display a third interface of a second application;
display L speech input prompts on the third interface, wherein the third interface comprises at least one control used to update the third interface, wherein each speech input prompt of the L speech input prompts corresponds to one control on the third interface, wherein L is an integer greater than 0, and wherein each speech input prompt of the L speech input prompts is different from each speech input prompt of the M speech input prompts;
collect a second speech control signal entered by the user, wherein the second speech control signal corresponds to a second speech input prompt of the L speech input prompts, wherein the second speech input prompt corresponds to a second control on the third interface, and wherein the second control is one of the at least one control of the third interface;
display on the third interface, in response to the second speech control signal, a second animation effect generated by simulating a touch operation of triggering the second control; and
display, after displaying the second animation effect, a fourth interface of the second application in response to the second speech control signal, wherein the fourth interface is the same as an interface obtained through updating the second control on the third interface is triggered by a touch operation.

2. The electronic device according to claim 1, wherein the one or more computer programs further include instructions to perform, after the speech application is running in the background:
execute, in response to a touch control operation performed by the user on the control on the first interface is detected, an operation instruction corresponding to the touch control operation.

3. The electronic device according to claim 1, wherein the one or more computer programs further include instructions to perform, after the speech application is running in the background:
display an identifier of the speech application on the first interface.

4. The electronic device according to claim 1, wherein the first application is a music application, wherein the first interface is a music playback interface of the music application, and wherein the one or more computer programs further include instructions to:
display, on the first interface, one or more of:
a play control and a speech input prompt corresponding to the play control; or a pause control and a speech input prompt corresponding to the pause control; or a switch to a previous control and a speech input prompt corresponding to the switch to the previous control; or a switch to a next control and a speech input prompt corresponding to the switch to the next control; or a turn up a volume control and a speech input prompt corresponding to the turn up the volume control; or a turn down the volume control and a speech input prompt corresponding to the turn down the volume control.

5. The electronic device according to claim 4, wherein the instructions to display the pause control and the speech input prompt corresponding to the pause control on the first interface include instructions to:

receive a third speech control signal used for pause entered by a user;

display the second interface in response to the third speech control signal used for pause, wherein the second interface is an interface obtained through updating after the pause control on the first interface is triggered, wherein the second interface displays the play control and the speech input prompt corresponding to the play control, and wherein the second interface does not display the pause control and the speech input prompt corresponding to the pause control.

6. The electronic device according to claim 1, wherein the first application is a camera application, wherein the first interface is a photographing interface of the camera application, and wherein the one or more computer programs further include instructions to:

display, on the first interface, one or more of:

a photographing control and a speech input prompt corresponding to the photographing control; or a recording control and a speech input prompt corresponding to the recording control; or an enabling a front-facing camera control and a speech input prompt corresponding to the enabling the front-facing camera control; or a viewing a photo control and a speech input prompt corresponding to the viewing a photo control.

7. The electronic device according to claim 6, wherein the one or more computer programs further include instructions to:

receive a fourth speech control signal used for photographing entered by the user on the photographing interface;

photograph a photo in response to the fourth speech control signal used for photographing, and continue to display the photographing interface and speech input prompts corresponding to the photographing interface; and display, in response to photographing the photo, a photo thumbnail of the photo on the photographing interface.

8. The electronic device according to claim 7, wherein the one or more computer programs further include instructions to:

receive a fifth speech control signal used for viewing a photo entered by the user on the photographing interface;

display the photo in response to the fifth speech control signal used for viewing the photo.

9. The electronic device according to claim 8, wherein the one or more computer programs further include instructions to:

receive, on an interface for displaying the photo, a sixth speech control signal used for zooming in entered by the user, and zooming in the photo; or receive, on the interface for displaying the photo, a seventh speech control signal used for zooming out entered by the user, and zooming out the photo; or receive, on the interface for displaying the photo, an eighth speech control signal used for reviewing a next photo entered by the user, and performing a slide operation on the photo; or receive, on the interface for displaying the photo, a ninth speech control signal used for returning to the camera application entered by the user, and displaying the photographing interface of the camera application.

10. The electronic device according to claim 1, wherein the first speech control signal comprises a name of the first control, or the second speech control signal comprises a name of the second control.

11. The electronic device according to claim 10, wherein the one or more computer programs further include instructions to perform at least one of:

obtain the name of the first control by using a configuration file; or obtain the name of the second control by using a configuration file.

12. The electronic device according to claim 1, wherein the speech application is enabled in response to a wake-up signal entered by a user, and wherein the wake-up signal comprises at least one of:

a wake-up word entered by a user; or a click signal of the user on a button; or a touch gesture of the user.

13. The electronic device according to claim 12, wherein the one or more computer programs further include instructions to perform, after the speech application is enabled, immediately display the M speech input prompts on the first interface.

14. The electronic device according to claim 12, wherein the one or more computer programs further include instructions to perform, after the speech application is enabled, display the M speech input prompts on the first interface after a preset time period.

15. The electronic device according to claim 1, wherein the one or more computer programs further include instructions to:

automatically hide the M speech input prompts before the electronic device collects the first speech control signal entered by the user.

16. The electronic device according to claim 1, wherein the simulating the touch operation of triggering the first control comprises simulating an operation of finger clicking the first control.

17. A speech control method, comprising:

displaying, by an electronic device, a first interface of a first application, wherein the first interface comprises at least one control used to update the first interface, wherein a speech application for speech recognition is running in a background when the first interface is displayed;

displaying, by the electronic device on the first interface, M speech input prompts, wherein each speech input prompt of the M speech input prompts corresponds to one control on the first interface, and wherein M is an integer greater than 0;

collecting, by the electronic device, a first speech control signal entered by a user, wherein the first speech control signal corresponds to a first speech input prompt of the M speech input prompts, wherein the first speech input prompt corresponds to a first control on the first interface, and wherein the first control is one of the at least one control of the first interface;

displaying by the electronic device on the first interface, in response to the first speech control signal, a first animation effect generated by simulating a touch operation of triggering the first control;

displaying, by the electronic device, after displaying the first animation effect, a second interface of the first application in response to the first speech control signal, wherein the second interface is the same as an interface obtained through the first control being triggered by a touch operation;

displaying, by the electronic device, a third interface of a second application;

displaying, by the electronic device, L speech input prompts on the third interface, wherein the third interface comprises at least one control used to update the third interface, wherein each speech input prompt of the L speech input prompts corresponds to one control on the third interface, wherein L is an integer greater than 0, and wherein each speech input prompt of the L speech input prompts is different from each speech input prompt of the M speech input prompts;

collecting, by the electronic device, a second speech control signal entered by the user, wherein the second speech control signal corresponds to a second speech input prompt of the L speech input prompts, wherein the second speech input prompt corresponds to a second control on the third interface, and wherein the second control is one of the at least one control of the third interface;

display by the electronic device on the third interface, in response to the second speech control signal, a second animation effect generated by simulating a touch operation of triggering the second control; and displaying, by the electronic device, after displaying the second animation effect, a fourth interface of the second application in response to the second speech control signal, wherein the fourth interface is the same as an interface obtained through the second control on the third interface is triggered by a touch operation.

18. The method according to claim 17, wherein the first application is a camera application, wherein the first interface is a photographing interface of the camera application, and wherein the method further comprises:

displaying, on the first interface, by the electronic device, one or more of:
a photographing control and a speech input prompt corresponding to the photographing control; or
a recording control and a speech input prompt corresponding to the recording control; or
a enabling a front-facing camera control and a speech input prompt corresponding to the enabling the front-facing camera control; or
a viewing a photo control and a speech input prompt corresponding to the viewing a photo control.

19. The method according to claim 18, wherein the method further comprises:

receiving, by the electronic device, a third speech control signal used for photographing entered by the user on the photographing interface;

photographing, by the electronic device, a photo in response to the third speech control signal used for photographing, and continuing to display the photographing interface and speech input prompts corresponding to the photographing interface; and displaying, by the electronic device, in response to the photographing the photo, a photo thumbnail of the photo on the photographing interface.

20. The method according to claim 19, wherein the method further comprises:

receiving, by the electronic device, a fourth speech control signal used for viewing a photo entered by the user on the photographing interface;

displaying, by the electronic device, the photo in response to the fourth speech control signal used for viewing the photo.

\* \* \* \* \*

UNITED STATES PATENT AND TRADEMARK OFFICE
CERTIFICATE OF CORRECTION

| | |
|---|---|
| PATENT NO. | : 11,450,322 B2 |
| APPLICATION NO. | : 17/295569 |
| DATED | : September 20, 2022 |
| INVENTOR(S) | : Xuan Zhou et al. |

It is certified that error appears in the above-identified patent and that said Letters Patent is hereby corrected as shown below:

In the Specification

In the Detailed Description of Illustrative Embodiments, Column 8, Line 28; delete "no" and insert --110--.

In the Detailed Description of Illustrative Embodiments, Column 22, Line 38; delete "farther" and insert --further--.

Signed and Sealed this
Eighteenth Day of October, 2022

Katherine Kelly Vidal
*Director of the United States Patent and Trademark Office*